US012703524B2

(12) United States Patent
Mayounove et al.

(10) Patent No.: US 12,703,524 B2
(45) Date of Patent: Aug. 11, 2026

(54) OMNIDIRECTIONAL PROPELLED VEHICLE COMPRISING A CHASSIS AND A FIRST ROTARY SHAFT

(71) Applicant: AERIX SYSTEMS, Merignac (FR)

(72) Inventors: Hugo Mayounove, Merignac (FR); Clément Picaud, Merignac (FR)

(73) Assignee: AERIX SYSTEMS, Merignac (FR)

( * ) Notice: Subject to any disclaimer, the term of this patent is extended or adjusted under 35 U.S.C. 154(b) by 0 days.

(21) Appl. No.: 18/849,330

(22) PCT Filed: Mar. 21, 2023

(86) PCT No.: PCT/EP2023/057119
§ 371 (c)(1),
(2) Date: Sep. 20, 2024

(87) PCT Pub. No.: WO2023/180267
PCT Pub. Date: Sep. 28, 2023

(65) Prior Publication Data

US 2025/0019098 A1 Jan. 16, 2025

(30) Foreign Application Priority Data

Mar. 22, 2022 (FR) .................................. FR2202534

(51) Int. Cl.
*B64U 50/19* (2023.01)
*B64U 10/14* (2023.01)
*B64U 20/80* (2023.01)

(52) U.S. Cl.
CPC ............. *B64U 50/19* (2023.01); *B64U 10/14* (2023.01); *B64U 20/80* (2023.01)

(58) Field of Classification Search
CPC ...... B64U 10/14; B64U 10/20; B64U 30/294; B64U 30/297; B64C 29/0033; B64C 27/24; B64C 27/52; B64C 15/12
See application file for complete search history.

(56) References Cited

U.S. PATENT DOCUMENTS 11,208,197 B2 * 12/2021 Marot .................... B64U 50/19
2018/0354607 A1 12/2018 Marot et al.
2022/0221029 A1 * 7/2022 Balan ....................... B63H 5/14

FOREIGN PATENT DOCUMENTS

CN 107757912 A 3/2018
CN 108313291 A 7/2018
(Continued)

*Primary Examiner* — Arfan Y. Sinaki
(74) *Attorney, Agent, or Firm* — Greer, Burns & Crain, Ltd.

(57) ABSTRACT

The invention relates to a propelled vehicle (D1; D2) comprising: an electrical power source (SE), a chassis (C), a first shaft (A1) supporting a propulsion unit (P) and mounted such that it can rotate on the chassis about a first axis (AX1), and a first device (E1) for rotating the first shaft, characterized in that the chassis comprises a first member (OGR1) for guiding the first shaft in rotation, in that the first shaft comprises a first complementary member (OC1) mechanically cooperating with the first guide member, and in that the first guide member and the first complementary member are electrically conductive and are electrically connected to one another, the first guide member being electrically connected to the electrical power source and the first complementary member being electrically connected to the propulsion unit.

20 Claims, 11 Drawing Sheets

(56) References Cited

FOREIGN PATENT DOCUMENTS

| | | | |
|---|---|---|---|
| CN | 110697035 | A | 1/2020 |
| EP | 0299854 | A1 | 1/1989 |

* cited by examiner

OMNIDIRECTIONAL PROPELLED VEHICLE COMPRISING A CHASSIS AND A FIRST ROTARY SHAFT

TECHNICAL FIELD

The invention relates the field of propelled vehicles, and in particular that of remotely piloted aerial vehicles, or UAVs. More specifically, the invention relates to a propelled vehicle incorporating a solution for the electrical connection between a stator and a rotor.

BACKGROUND

A remotely piloted aerial vehicle, also known as a UAV (unmanned aerial vehicle) or drone, comprises, in a known manner, multiple propulsion units, for example equipped with propellers or blades, mounted on a chassis. To control the direction of the drone, each propulsion unit can be fitted with an electric variable speed drive that can be remotely controlled, for example from a controller operated by a user. The direction of the drone can thus be controlled by increasing the rotational speed of the propellers of some propulsion units and/or decreasing the rotational speed of the propellers of other propulsion units.

While this type of technology does allow the direction of the drone to be controlled, it does not offer satisfactory drone handling, particularly over a wide range of speeds and/or movements. To overcome this drawback, it is also known practice to arrange each propulsion unit on a shaft that is pivotably mounted on the chassis, the shaft being able to be driven by a motor. The user is thus able to remotely control the motor of the shaft in order to modify the orientation of the propulsion unit and thereby control the direction of the drone.

Such a drone is described, for example, in US2018/0354607.

In this type of architecture, the battery of the drone is also arranged on the chassis of the drone. This raises the question of how to electrically connect the battery to the propulsion unit of the drone. Specifically, the shaft must be able to rotate relative to the chassis while at the same time allowing the electrical power supplied by the battery to be transmitted to the propulsion unit mounted on this shaft without interruption.

One solution to address this need is to use a so-called rotary collector, for example a slip ring. This type of collector comprises a ring mounted on a rotor with which brushes, or carbon brushes, are in contact, allowing electrical power to be transmitted from the battery to the shaft even when the shaft is rotating.

While a rotary collector does indeed address the aforementioned need, the electrical power required to operate a drone requires a particularly large number of brushes and these brushes to be of substantial size, which in turn means that the collector takes up a considerable amount of space. This space requirement presents a number of problems, particularly in terms of cost, weight and the interference the collector is liable to cause in the airflow generated by the propulsion unit. This last point is particularly critical, given the potential proximity of the collector to the propulsion unit. This type of collector is therefore unsatisfactory.

These drawbacks are also found in other technical fields, for example in underwater drones (also known as AUVs or autonomous underwater vehicles), and more broadly in any vehicle fitted with a rotary propulsion unit that needs to be supplied with electricity.

There is therefore a need for a propelled vehicle in which the or each propulsion unit is arranged on a shaft rotatably mounted on a chassis, and which incorporates a space-saving solution for transmitting the electrical power supplied by a power source mounted on the chassis to the propulsion unit.

SUMMARY

The present invention is placed in this context and aims to meet this need.

One subject of the invention is a propelled vehicle comprising:

a. an electrical power source, b. a chassis supporting the electrical power source, c. a first shaft supporting a propulsion unit of said propelled vehicle, mounted such that it can rotate on the chassis about a first axis of rotation, and d. a first drive device for rotating the first shaft about said first axis of rotation.

The invention is noteworthy in that the chassis comprises a first member for guiding the first shaft in rotation about said first axis of rotation, in that the first shaft comprises a first complementary member arranged to mechanically cooperate with the first guide member so as to remove at least one degree of freedom from the first shaft, and in that the first guide member and the first complementary member are electrically conductive and are electrically connected to one another, the first guide member being electrically connected to the electrical power source and the first complementary member being electrically connected to the propulsion unit.

It is thus understood that the invention proposes taking advantage of an element that is already present in the architecture of the propelled vehicle, namely a member for guiding the first shaft in rotation on the chassis, by giving it a second function of transmitting electrical power. Specifically, the rotational guide members present in a propelled vehicle, as well as the complementary members, can be made of an electrically conductive material, e.g. bronze. These guide members may be direct-contact guide members, guide members that use a friction ring or surface coating, or guide members that use a rolling elements, such as roller bearings, other types of bearings or pads. These rotational guide members are furthermore necessarily in contact with the complementary members, along the rotation of the first shaft, in order to be able to perform their guiding function. By electrically connecting a guide member to the electrical power source of the propelled vehicle and the member complementary to this guide member to the propulsion unit of the propelled vehicle, electrical power can therefore be transmitted from the chassis to the propulsion unit via this contact between the guide member and the complementary member even when the orientation of the propulsion unit is changed as a result of rotation of the shaft without this taking up additional space.

BRIEF DESCRIPTION OF THE DRAWINGS

The present invention is now described with the aid of examples that are purely illustrative and in no way limit the scope of the invention, and based on the attached drawings, in which.

DETAILED DESCRIPTION

In the following description, identical elements, by structure or function, appearing in different figures retain, unless otherwise specified, the same references.

Figure 1:
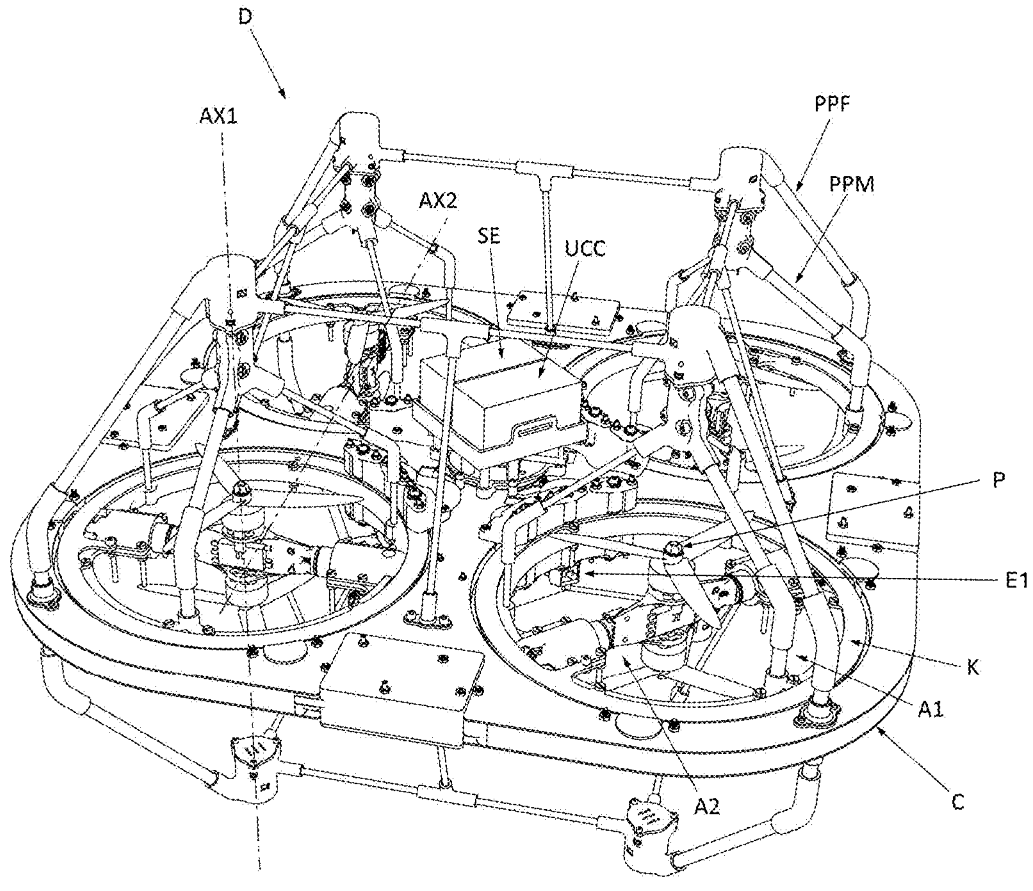
FIG. 1 schematically and partially shows a perspective view of an omnidirectional drone according to a first embodiment of the invention.

FIG. 1 shows a propelled vehicle in the form of an omnidirectional drone D, according to a first embodiment of the invention.

In the invention, the chassis can directly or indirectly support the electrical power source and the first shaft can directly or indirectly support the propulsion unit. The term "indirect support" may indicate, for example, that one or more elements can be mechanically positioned between the electrical power source or the propulsion unit and the chassis or the first shaft, respectively. For example, the electrical power source could be an electric battery housed in a receptacle in the chassis provided for this purpose.

In the invention, the first guide member can be directly or indirectly electrically connected to the electrical power source, and the first complementary member can be directly or indirectly electrically connected to the propulsion unit. The term "indirect electrical connection" may indicate, for example, that one or more elements can be electrically positioned between the electrical power source or the propulsion unit and the first guide member or the first complementary member, respectively. For example, a cable could be connected to an electric battery of the propelled vehicle and soldered to the first guide member.

In the invention, the first guide member cooperates with the first complementary member so as to remove at least one degree of freedom from the first shaft, i.e. to oppose movement of the first shaft in a given direction or to oppose rotation of the first shaft about a given axis, this axis necessarily being distinct from the first axis of rotation. The first guide member and the first complementary member can cooperate so as to oppose movement of the first shaft in a direction parallel to the first axis of rotation and/or in a direction perpendicular to the first axis of rotation. It is possible to envisage the first guide member cooperating with the first complementary member so as to remove multiple degrees of freedom from the first shaft. Alternatively or additionally, it is possible to envisage the chassis comprising a plurality of first rotational guide members, each cooperating with a first complementary member provided on the first shaft so as to remove a degree of freedom from the first shaft, it being understood that these first guide members and the first complementary members can all be structurally distinct from one another and/or can remove different degrees of freedom with respect to one another and/or participate in the function of transmitting electrical power from the chassis to the first shaft. In particular, it is possible to envisage a single pair of first guide members and of first complementary members being electrically conductive and/or electrically connected to the electrical power source and to the propulsion unit.

In the invention, the chassis can take the shape of a plate in which a space, for example a substantially circular space, is made in which the first shaft can rotate about the first axis of rotation. The chassis could, for example, be a stack of multiple layers including, for example, two central layers produced by 3D printing a polymer, in particular comprising polylactic acid (PLA) or a layer of polyurethane foam, covered by an upper layer and a lower layer of another material, for example carbon or aluminum. Where applicable, one or more electrical cables connected to the electrical power source can be accommodated in a cavity provided between the central layers or in inserts provided in a central layer for routing the cables. If desired, the chassis could comprise a plurality of spaces, in particular four spaces, and a plurality of, in particular four, first shafts, each supporting a propulsion unit and each driven by a first drive system, each being able to be rotatably mounted on the chassis in one of these spaces.

In a first embodiment of the invention, the first drive device comprises a motor provided with a rotary shaft that rotates about the first axis of rotation; the first shaft comprises a transmission member that is mechanically connected to the rotary shaft of the motor so that rotation of the shaft of the motor is transmitted to the first shaft; the first complementary member comprises a first bearing which is mounted on the transmission member and the first rotational guide member comprises a second bearing which is mounted concentrically around the first bearing. This configuration considerably reduces the size and weight of the components involved in transmitting electrical power to the propulsion unit.

Advantageously, the first shaft could be supported at two distinct points on the chassis, said points defining the first axis of rotation, and the first drive device could be accommodated in the chassis at one of these points where the first shaft is supported on the chassis.

For example, the first drive system could comprise a transmission cylinder with a polygonal, in particular hexagonal, cross section, driven by a motor and fitted into an opening in the transmission member of the first shaft, with a cross section complementary to that of the transmission cylinder, the connection between the transmission cylinder and the opening in the transmission member forming one of the points where the first shaft is supported on the chassis. These features provide a robust connection between the first drive system and the first shaft which does not weaken the first shaft over time, even if it is made by 3D printing a polymer. Alternatively, the transmission cylinder could be circular in cross section, and truncated to form a flat surface. Where applicable, the motor could comprise a rotary shaft that rotates about the first axis of rotation and is inserted into the transmission cylinder, a set screw being screwed into a tapped hole in the transmission cylinder, provided in line with the cavity in the transmission cylinder into which the rotary shaft of the motor is inserted, in order to secure the transmission cylinder to the rotary shaft of the motor. Alternatively, it is possible to envisage the transmission member of the first shaft comprising a portion of polygonal cross section which is inserted into an opening of complementary cross section made in the transmission cylinder.

Advantageously, the first bearing could be a ring or sleeve made of an electrically conductive material, in particular bronze and, for example, sintered bronze impregnated and/or coated with a lubricant such as electrically conductive grease, with a longitudinal axis that is substantially identical to the first axis of rotation, and mounted in a fixed manner on the transmission member of the first shaft which is fitted into this first bearing. Where applicable, at least one cable electrically connected to the propulsion unit can be soldered to the first bearing. Alternatively, said cable can be inserted into a lug mounted on and electrically connected to the first bearing.

Preferably, the second bearing could be a ring or sleeve made of an electrically conductive material, in particular bronze and, for example, sintered bronze impregnated and/or coated with a lubricant such as electrically conductive grease, with a longitudinal axis that is substantially identical to the first axis of rotation, and mounted freely or fixedly on the chassis and with a diameter substantially greater than that of the first bearing. Where applicable, at least one cable electrically connected to the electrical power source can be soldered to the second bearing. Alternatively, said cable can be inserted into a lug mounted on and electrically connected to the second bearing.

Advantageously, the inner surface of the second bearing and the outer surface of the first bearing are smooth and in direct contact with one another. Alternatively, a coating, in particular a film of electrically conductive grease or oil coating or impregnating either or both of the bearings, can be positioned between the inner surface of the second bearing and the outer surface of the first bearing.

In one example of the first embodiment, the first shaft comprises a frame comprising two diametrically opposed pivots, each pivotably mounted in a recess in the chassis, said recesses facing one another. Where applicable, the transmission member is arranged on one of the pivots so as to extend into one of said recesses, the rotary shaft of the motor extends into this recess and the first bearing is arranged in this recess, the profile of the recess corresponding substantially to that of the second bearing. In this example, one of the pivots forms the transmission member of the first shaft and the connection between each pivot of the first shaft and the recess in the chassis forms one of the points where the first shaft is supported on the chassis. By way of non-limiting example, the frame could be substantially circular, oval, elliptical, conical or oblong.

In one example, the pivot forming the transmission member of the first shaft can be formed by two half-shells joined to one another, one of the half-shells being connected to the rest of the first shaft, and each half-shell comprises a groove, the grooves facing one another, when the half-shells are joined together, to form the opening in the transmission member into which the transmission cylinder is inserted.

Advantageously, the second bearing comprises a peripheral stop, in particular extending around the entire periphery of the second bearing and preferably formed at an edge of the second bearing, and the recess comprises a peripheral groove in which the peripheral stop of the second bearing is accommodated. This peripheral stop and this peripheral groove make it possible to block the translation of the first shaft in a direction perpendicular to the first axis of rotation and along the first axis of rotation.

Preferably, the first bearing comprises a peripheral stop, in particular extending around the entire periphery of the first bearing and preferably formed at an edge of the first bearing. Where applicable, the peripheral stop of the first bearing can face a peripheral rim of the recess and/or be clamped between the peripheral stop of the second bearing and a rim of the first shaft provided in line with the transmission member of the first shaft. These features make it possible to reinforce the blocking of the translation of the first shaft in the direction perpendicular to the first axis of rotation and along the first axis of rotation. Alternatively, the peripheral stop of the second bearing so as to abut against a wall of the recess and the peripheral stop of the first bearing can be positioned opposite the peripheral stop of the second bearing and abut against a wall of the first shaft opposite the wall of the recess. In other words, the bearings are clamped, via their stops, between opposing walls of the recess and the first shaft.

In a second embodiment of the invention, the first shaft comprises a ring unit that is rotationally symmetrical about the first axis of rotation, the first complementary member comprises a band mounted on the ring unit and the first rotational guide member comprises a pad bearing flat against said band.

In one embodiment of the invention, said ring unit comprises a plurality of teeth arranged around at least some, in particular, all of its circumference and said first drive system comprises a pinion, or a gear or toothed wheel, that is driven by a motor and meshes with said teeth of the ring unit. In other words, rotation of a shaft of said first motor, on which the pinion is mounted, is transmitted to the ring unit through the rotation of said pinion. In another embodiment of the invention, the first drive system comprises a belt driven by a motor and tensioned around the circumference of said ring unit. In other words, rotation of a shaft of said first motor, on which is mounted a pulley on which the belt is tensioned, is transmitted to the ring unit through the rotation of this pulley.

Where applicable, the element of the first drive system that meshes with said plurality of teeth and said plurality of teeth can be electrically conductive and electrically connected to one another, said element being electrically connected to the electrical power source and said plurality of teeth being electrically connected to the propulsion unit. Alternatively, at least the belt, the pulley and the portion of the ring unit on which said belt is tensioned can be electrically conductive, the pulley and said portion of the ring unit being electrically connected to one another through the belt, the pulley being electrically connected to the electrical power source and said portion of the ring unit being electrically connected to the propulsion unit.

Advantageously, the band is a section of a ring or a complete ring made of an electrically conductive material, in particular aluminum, the band being fixed, for example by screwing, to an upper or lower surface of the ring unit of the first shaft. Where applicable, it is possible to envisage the first complementary member comprising multiple bands distributed around the circumference of the ring unit of the first shaft. If desired, the band could be coated with a coating, in particular a film of electrically conductive grease or oil, which coats or impregnates either or both of the strip and/or the pad, and is positioned between the strip and the pad. Preferably, at least one cable electrically connected to the propulsion unit can be soldered to the band. Alternatively, said cable could be inserted into a lug mounted on and electrically connected to the band.

Advantageously, the pad is made of an electrically conductive material, in particular bronze. The first guide member could comprise multiple radially and/or longitudinally offset pads bearing flat against said band. Preferably, at least one cable electrically connected to the electrical power source can be soldered to the pad. Alternatively, said cable could be inserted into a lug mounted on and electrically connected to the pad.

If desired, the first guide member could also comprise a roller or a roller bearing, in particular radially offset behind the pad or longitudinally offset from the pad, and making contact with the ring unit of the first shaft or with the band. For example, the roller could be mounted on the chassis so as to rotate about an axis substantially parallel to the first axis of rotation, and can come into contact with a rib provided on the ring unit. Alternatively, the roller bearing could be rotatably mounted on the chassis so as to rotate about an axis that is substantially perpendicular to the first axis of rotation, and in particular passes through the center of the ring unit of the first shaft, and could make contact with an upper or lower face of the band.

Advantageously, the chassis, and in particular the first guide member, comprises a module for pressing the pad onto said band. The pressing module is arranged so as to exert a force on the pad in the direction of the band. According to one example, the pad could comprise a rod, at the end of which a plate is formed, and the pressing module could comprise a guide part into which the rod of the pad fits Advantageously, said ring unit comprises at least one rib around at least some, in particular all, of its circumference, the rib forming the male element as well as the first complementary member, and the first rotational guide member comprises a part that is rotatably mounted on the chassis so as to rotate about an axis that is substantially parallel to the first axis and is provided with a groove forming the female element. Where applicable, the rib can have a profile that is substantially complementary to the profile of the groove. For example, the rib and groove could each have a trapezoidal profile, with the oblique faces of the rib bearing against the oblique faces of the groove in said part. Alternatively, said ring unit comprises at least one groove around at least some, in particular all, of its circumference, the groove forming the female element as well as the first complementary member, and the first rotational guide member comprises a part that is rotatably mounted on the chassis so as to rotate about an axis that is substantially parallel to the first axis and is provided with a rib forming the male element.

According to one example, the rib could be a central rib, positioned in a median portion of the outer surface of the ring unit. Where applicable, the ring unit could comprise a first plurality of teeth arranged above the central rib and a second plurality of teeth arranged below the central rib. In another embodiment, the rib could be an off-axis rib, positioned on an upper or lower edge of the outer surface of the ring unit. Where applicable, the ring unit could comprise two off-axis ribs, positioned respectively on an upper and a lower edge of the outer surface of the ring unit, the ring unit comprising a plurality of teeth arranged between the two ribs, and each rib fitting into a dedicated groove in the first rotational guide member.

Advantageously, said part could comprise two rollers, in particular tapered rollers, one above the other and arranged so as to define a space between the rollers which forms said groove. Alternatively, the part could comprise a bearing such as a grooved pulley.

In one alternative or additional embodiment of the invention, said ring unit comprises at least one rib around at least some, in particular all, of its circumference, the rib forming the male element as well as the first complementary member, and the first rotational guide member comprises a friction pad that is fixedly mounted on the chassis and provided with a groove forming the female element.

Advantageously, and regardless which embodiment of the first rotational guide member is envisaged, it is possible to envisage the rotational guide member being attached to the chassis by screwing into an oblong hole. In this way, the position of the first guide member can be adjustable.

It is possible to envisage the chassis comprising a plurality of first rotational guide members, each cooperating with a complementary first member provided on the first shaft, for example one first guide member comprising multiple pads bearing flat against a band mounted on the ring unit, and two tapered rollers one above the other and between which a peripheral rib of the ring unit is accommodated, and two other first guide members each comprising only two tapered rollers one above the other and between which the peripheral rib of the ring unit is accommodated. Where applicable, it is possible to make provision for only part of one and/or only one, or some, of these first guide member-first complementary member pairs to be electrically conductive and/or electrically connected to the electrical power source and to the propulsion unit.

Advantageously, the propelled vehicle comprises a second member for guiding the first shaft in rotation about said first axis of rotation, and the first shaft comprises a second complementary member arranged to mechanically cooperate with the second guide member so as to remove at least one degree of freedom from the first shaft, the second guide member and the second complementary member being electrically conductive and being electrically connected to one another, the second guide member being electrically connected to the electrical power source and the second complementary member being electrically connected to the propulsion unit. According to this feature, it is possible to transmit an electric current, in particular an alternating or direct current, delivered by the electrical power source to the propulsion unit, the first guide member—first complementary member pair forming, for example, a phase terminal, or a positive terminal, and the second guide member—second complementary member pair forming, for example, a neutral terminal, or a negative terminal.

In one of the above-described embodiments, it is possible to envisage, for example, the second complementary member comprising a first bearing mounted on the other of the pivots of the frame of the first shaft, opposite the pivot forming the transmission member, and the second rotational guide member comprising a second bearing mounted concentrically around this first bearing.

In the other above-described embodiment, it is possible to envisage, for example, the second complementary member comprising a band mounted on the ring unit, on a face opposite the face on which the first complementary member is mounted, and the second rotational guide member comprising a pad bearing flat against said band of this second complementary member. Where applicable, the pads of the first and second rotational guide members can face one another. Preferably, the bands can be assembled on either side of the ring unit by means of the same screw, said screw being fitted with an insulating member around its periphery.

This insulating member prevents the current from flowing directly from one band to the other. Alternatively, it is possible to make provision for the second complementary member to comprise a band mounted on the ring unit, on the same face supporting the first complementary member, the second complementary member being arranged concentrically with respect to the first complementary member, i.e. radially offset inward or outward with respect to this first complementary member. Where applicable, the second rotational guide member could comprise a pad bearing flat against said band of this second complementary member.

In one embodiment of the invention, the propelled vehicle comprises a central control unit for the propelled vehicle which is capable of exchanging data with the propulsion unit. Where applicable, the propelled vehicle can comprise a plurality of fixed legs which extend from the chassis to a common base and a plurality of movable legs which extend from a movable base, which is mounted on the common base so as to rotate about the first axis of rotation, to the first shaft, and a rotary collector is arranged in the common base and in the movable base, at least one cable extending from the central control unit to the rotary collector through one of the fixed legs and another cable extending from the rotary collector to the propulsion unit through one of the movable legs. This embodiment is particularly advantageous when the first shaft is a ring unit, as this set of legs makes it possible to ensure that the first shaft is held in place on the chassis, the first shaft thus being suspended in the space provided in the chassis and in which the first shaft can rotate. This tubular support structure can thus be used to route cables therethrough for data exchange between the central control unit and the propulsion unit. The common base and the movable base form a common hollow part in which the rotary collector is arranged. Since this type of rotary collector allowing a fixed portion, on the common base, to be electrically connected to a rotating portion, on the movable base, is known per se, it will not be described in any more detail.

Preferably, the central control unit of the propelled vehicle is able to exchange data with one or more sensors of the propulsion unit, such as an inertial measurement unit, and/or with a variable speed drive of one or more motors of the propulsion unit.

Advantageously, the fixed legs are attached to the chassis and distributed around the entire periphery of the chassis space in which the first shaft can rotate about the first axis of rotation. Again advantageously, the movable legs are attached to the ring unit of the first shaft and distributed around the entire periphery of this ring unit. Preferably, the fixed and movable legs are arranged so that the common base and the movable base overhang the ring unit and are positioned on the first axis of rotation.

In another embodiment, provision could be made for the chassis to be provided with a rotary collector in the recess in the chassis accommodating the other of the pivots of the frame of the first shaft, opposite the pivot forming the transmission member, and in particular within the first bearing mounted on this other pivot, at least one cable extending from the central control unit to the rotary collector through the chassis and another cable extending from the rotary collector to the propulsion unit through said first bearing and inside a duct provided in this other pivot and through the first shaft.

In yet another embodiment, provision could be made for one face of the ring unit, in particular the face opposite the face on which the first complementary member is mounted, to comprise one or more electrical tracks, for example circular tracks, cooperating mechanically and electrically with one or more connectors, for example brushes, provided on the chassis in line with this ring unit. Where applicable, at least one cable extends from the central control unit to said one or more connectors and another cable extends from the tracks provided on the face of the ring unit to the propulsion unit.

In yet another embodiment, provision could be made for one from among the chassis and the first shaft to comprise an optical transmitter and/or receiver, and the other from among the chassis and the first shaft to comprise an optical receiver and/or transmitter that cooperates with the optical transmitter or optical receiver, respectively. Where applicable, at least one cable extends from the central control unit to said transmitter and/or receiver of the chassis and another cable extends from said transmitter and/or receiver of the first shaft to the propulsion unit.

In one embodiment of the invention, the propelled vehicle comprises:

a. a second shaft mounted on the first shaft so as to rotate about a second axis of rotation, the second shaft supporting said propulsion unit of said propelled vehicle;
b. a second drive device for rotating the second shaft about said second axis of rotation.

Where applicable, the first shaft comprises a first member for guiding the second shaft in rotation about said second axis of rotation and the second shaft comprises a first complementary member arranged to mechanically cooperate with the first guide member of the first shaft so as to remove at least one degree of freedom from the second shaft, the first guide member and the first complementary member being electrically conductive and being electrically connected to one another, the first guide member of the first shaft being electrically connected to the first complementary member of the first shaft and the first complementary member of the second shaft being electrically connected to the propulsion unit. It is thereby possible to obtain an omnidirectional propelled vehicle wherein the rotations of the first and second shafts allow the propelled vehicle to be oriented in all directions while keeping it compact. Preferably, the second drive is electrically connected to the first complementary member of the first shaft.

Preferably, the second shaft is mounted on the first shaft such that the second axis of rotation is substantially orthogonal to the first axis of rotation. For example, the second shaft could be supported at two distinct points on the first shaft, said points defining the second axis of rotation, and the second drive device could be accommodated in the first shaft at one of these points where the second shaft is supported on the first shaft.

Advantageously, the second drive device comprises a motor provided with a rotary shaft that rotates about the second axis of rotation; the second shaft comprises a transmission member that is mechanically connected to the rotary shaft of the motor so that rotation of the shaft of the motor is transmitted to the second shaft; the first complementary member of the second shaft comprises a first bearing which is mounted on the transmission member of the second shaft and the first guide member of the first shaft comprises a second bearing which is mounted concentrically around the first bearing. The features relating to the various embodiments for the first shaft and for the first and second bearings for guiding the first shaft in rotation and transmitting electrical power from the electrical power source can be used, alone or in combination, for the second shaft.

Advantageously, the propelled vehicle comprising a central control unit for the propelled vehicle which is capable of exchanging data with the propulsion unit, the second shaft comprises two diametrically opposed pivots, each pivotably mounted in a recess in the first shaft, said recesses facing one another, the transmission member of the second shaft is arranged on one of the pivots of the second shaft to extend into one of said recesses and the rotary shaft of the motor extends into this recess, a rotary collector is arranged in the other of the recesses in the first shaft, and at least one cable extends from the central control unit to the rotary collector through the first shaft and another cable extends from the rotary collector to the propulsion unit through the second shaft. Preferably, said rotary collector could be connected to the central control unit of the propelled vehicle for example via the rotary collector provided in the common base and the movable base or the rotary collector provided in the recess in the chassis According to one example, the ring unit of the first shaft comprises two tabs that are oriented radially toward the inside of the ring unit, the tabs being diametrically opposed, each tab accommodating one of the points where the second shaft is supported on the first shaft. Preferably, the second drive system could be mounted on one of said tabs. Where applicable, the rotary collector could be mounted on the other of said tabs. Provision could advantageously be made for two protective half-shells to be attached on either side of each tab in order to define the recesses for the first shaft.

Advantageously, the second shaft comprises a central part supporting the propulsion unit and two rods extending, along the second axis of rotation, on either side from the central part to a point where the second shaft is supported on the first shaft.

Preferably, the propulsion unit comprises propellers driven by a motor rotating about a third axis of rotation perpendicular to the second axis of rotation.

If desired, the second shaft could support two propulsion units mounted on either side of the second shaft, each propulsion unit being fitted with propellers, the propellers of the propulsion units being contra-rotating. The use of contra-rotating propellers makes it possible to remove gyroscopic effects from the propelled vehicle.

In one embodiment of the invention, the propelled vehicle is an omnidirectional aerial drone.

Provision could be made for the propulsion unit to be a blade- or propeller-based propulsion unit, a reaction turbine, or more generally any type of propulsion unit of which the orientation can be controlled by pivoting it and which requires an electrical power supply, in particular provided with a rotor and a stator.

The drone D comprises a chassis C on which four spaces are arranged, each space supporting a first shaft A1 comprising a ring unit K that is rotationally symmetrical about a first axis of rotation AX1 and mounted so as to rotate about said first axis AX1. Each ring unit K supports a second shaft A2 that is mounted so as to rotate about a second axis AX2, orthogonal to the first axis AX1, and on which a propeller P is mounted which comprises, in particular, a double contra-rotating propeller. The center of the chassis C supports a central control unit UCC which is able, in particular, to control the rotational speeds of the propulsion units P, and an electric battery SE which is arranged, in particular, to supply the propulsion system of the drone C with power. The chassis C also comprises a first drive system E1 for each first shaft A1 which is mounted on the chassis C.

Figure 2:
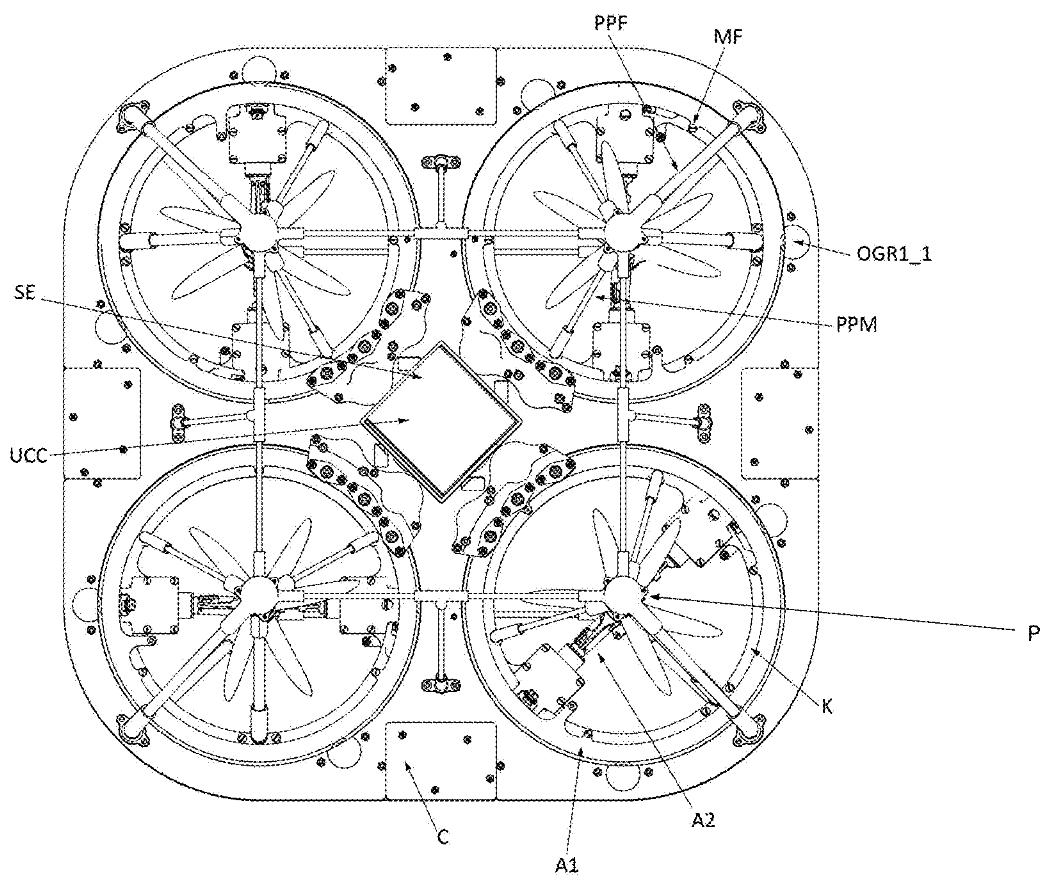
FIG. 2 schematically and partially shows a top view of the omnidirectional drone of FIG. 1.
Figure 3:
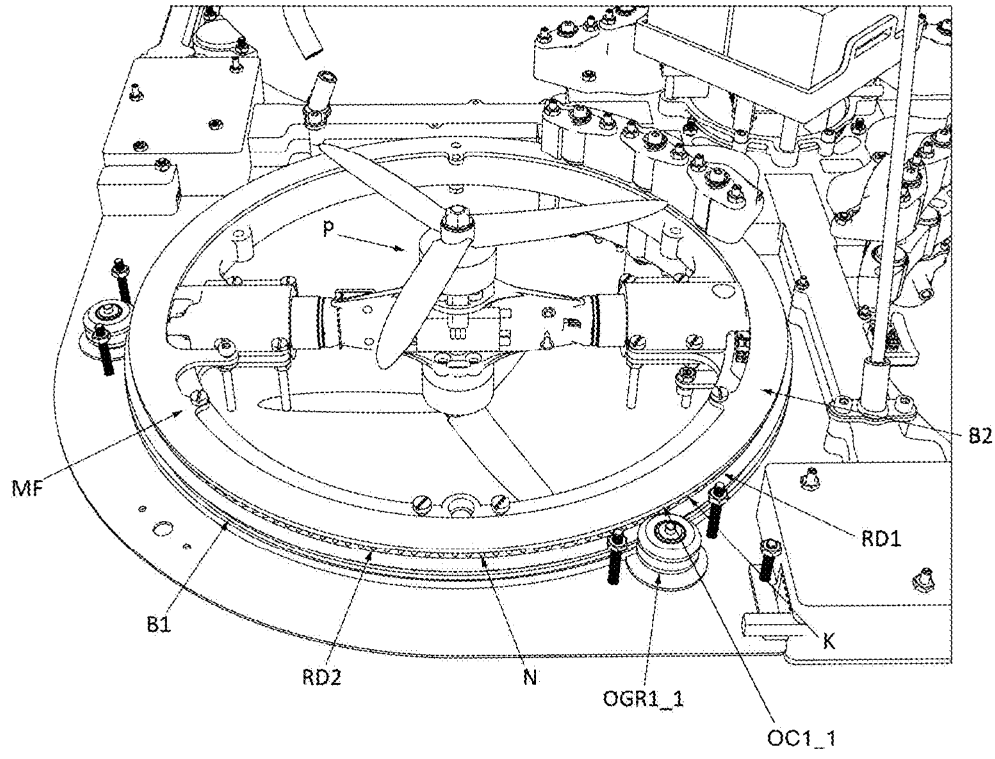
FIG. 3 schematically and partially shows one perspective view of a portion of the omnidirectional drone of FIG. 1.
Figure 4:
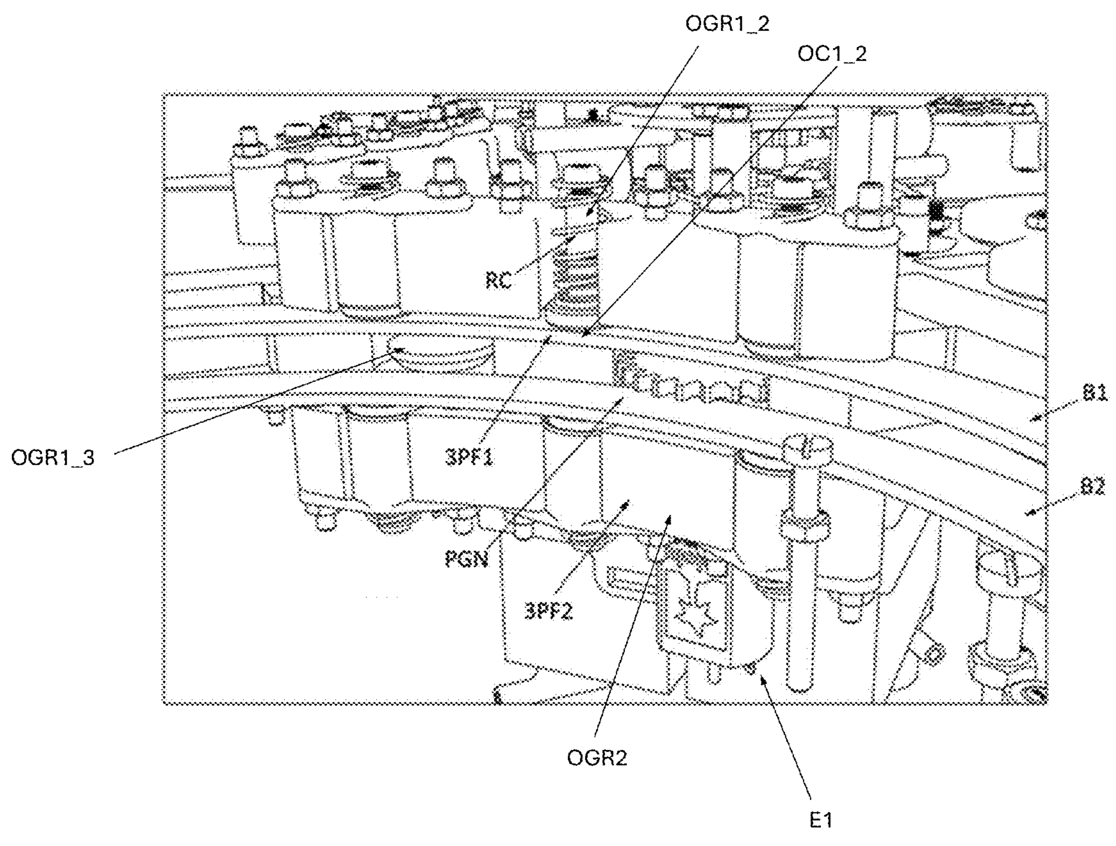
FIG. 4 schematically and partially shows a perspective view of a set of rotational guidance members and of complementary members of the omnidirectional drone of FIG. 1.
Figure 5:
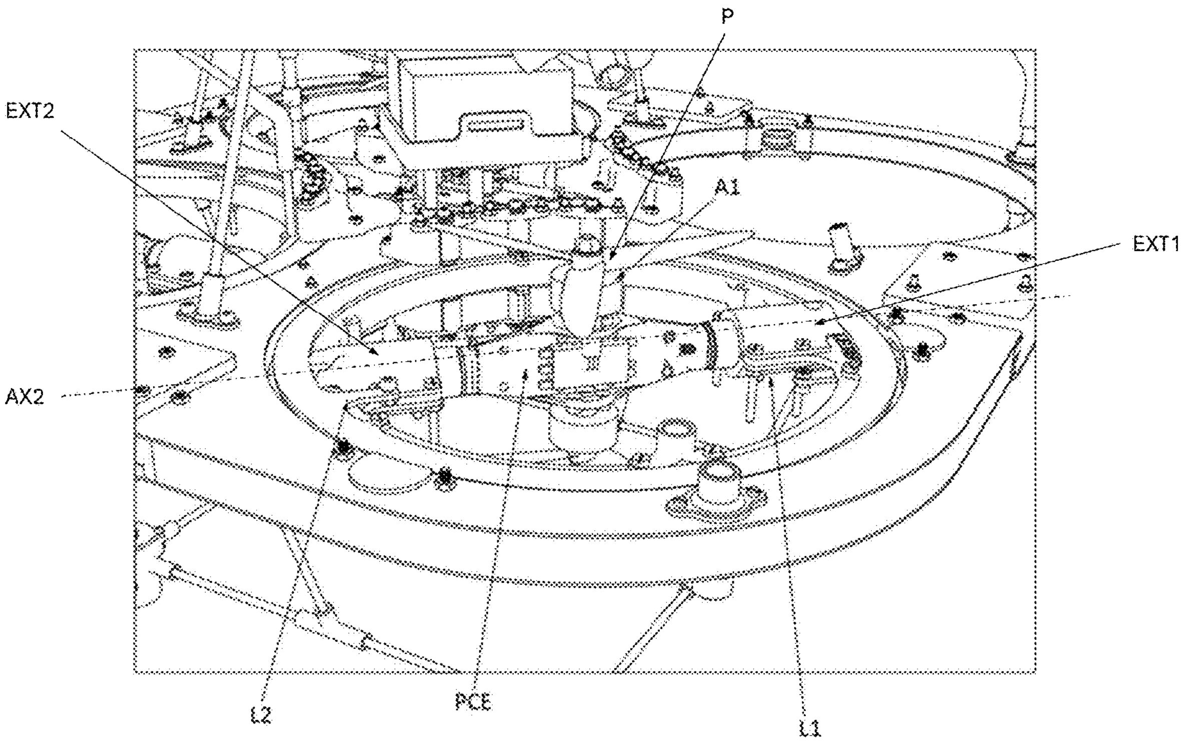
FIG. 5 schematically and partially shows another perspective view of the portion of the omnidirectional drone of FIG. 3.
Figure 6A:
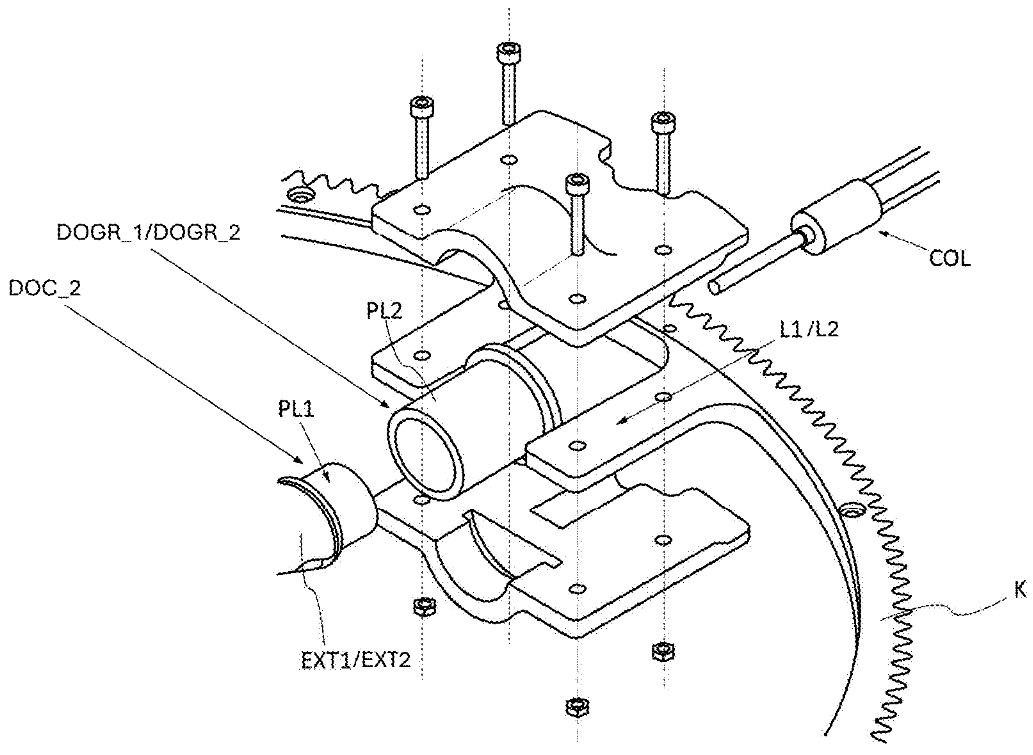
FIG. 6A schematically and partially shows a cross-sectional view of one connection between two shafts of the omnidirectional drone of FIG. 1.
Figure 6B:
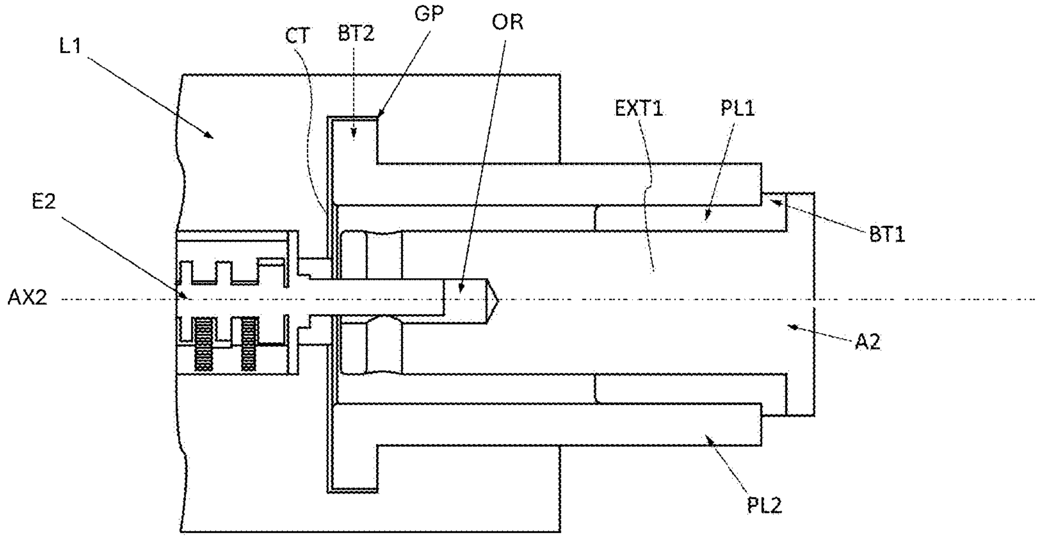
FIG. 6B schematically and partially shows an exploded view of another connection between two shafts of the omnidirectional drone of FIG. 1.

FIG. 2 shows a top view of the omnidirectional drone D; FIG. 3 shows a perspective view of a first shaft-second shaft-propeller assembly A1-A2-P of the omnidirectional drone of FIG. 1; FIG. 4 shows one perspective view of a set of rotational guide members and of complementary members of the assembly of FIG. 3; FIG. 5 shows another perspective view of the first shaft-second shaft-propeller A1-A2-P assembly of FIG. 3; FIG. 6A shows a cross-sectional view of one connection between the first shaft A1 and the second shaft A2 of the assembly of FIG. 3; and FIG. 6B shows an exploded view of another connection between the first shaft A1 and the second shaft A2 of the assembly of FIG. 3. In the following, only one of these assemblies will be described, it being understood that the four assemblies visible in FIG. 1 and FIG. 2 are identical.

The drone D comprises a plurality of fixed legs PPF which extend from the chassis C to a common base supported by the chassis C to which they are attached, and a plurality of movable legs PPM which extend from a movable base rotatably mounted on the common base so as to rotate about the first axis of rotation AX1. The movable legs PPM are attached to the first shaft A1 and are distributed around its entire circumference. The first shaft A1 is thus suspended in the space reserved for it while remaining rotatable about the first axis of rotation AX1.

As shown in FIG. 3, the ring unit K comprises a first plurality of teeth RD1 around its entire circumference, arranged on an upper rim of the ring unit K, and a second plurality of teeth RD2 around its entire circumference, arranged on a lower rim of the ring unit K.

The first drive system E1 comprises a motor driving a pinion PGN, visible in FIG. 4. This pinion PGN comprises two toothed regions which are parallel to one another and are arranged around the entire portion of an upper rim of the circumference of the pinion PGN and around the entire lower portion of a rim of the circumference of the pinion. Each of these two toothed regions is arranged so as to mesh with the plurality of upper and lower teeth RD1 and RD2 of the ring unit K such that the rotation of the pinion PGN brought about by the motor is transmitted to the ring unit K and consequently to the shaft A1. The shaft A1 thus pivots about the axis of rotation AX1, which is identical to the axis of revolution of the ring unit K.

The ring unit K comprises a central rib N around the entire median portion of its circumference, arranged between the first and second plurality of teeth RD1 and RD2. The chassis C comprises two first members OGR1_1 for guiding the first shaft A1 in rotation about the first axis of rotation AX1. These members OGR1_1 each take the form of a grooved bearing of which the profile is complementary to the geometry of the rib N. The rib N is accommodated in the groove of each bearing OGR1_1, thus forming a first complementary member OC1_1 cooperating mechanically with the first guide members OGR1_1. In the example described, the rib N and the groove of each bearing OGR1_1 have a trapezoidal profile, with the oblique faces of the rib N bearing against the oblique faces of this groove.

As shown in FIG. 3, the ring unit K of the first shaft A1 is surrounded by two parallel rings, B1 and B2, which are fitted to the upper and lower faces of the ring unit K. These rings, B1 and B2, are rotationally symmetrical about the axis AX1, and are securely mounted on the ring unit K by means of attachment means MF at various points on the first shaft A1. In the example described, the attachment means take the form of screws that are screwed through each of the bands B1 and B2 and the ring unit K.

As shown in FIG. 4, the chassis C comprises another first member OGR1_2 for guiding the first shaft A1 in rotation about the first axis of rotation AX1. This member comprises a plurality of friction pads 3PF1, taking the form of three consecutive pads. These pads 3PF1 bear flat against the upper ring B1, which thus forms another first complementary member OC1_2 cooperating with the other first rotational guide member OGR1_2.

Each friction pad 3PF1 comprises a rod and a plate provided at the end of the shaft in order to bear flat against the upper ring B1. The rod is mounted in a guide cylinder and a compression spring RC is arranged around the rod so as to butt, on the one hand, against an upper wall of the guide cylinder and, on the other hand, against the plate of the pad. Each pad 3PF1 thus exerts a force in a direction perpendicular to the surface of the ring B1 toward the ring B2.

Symmetrically, the chassis C comprises a second rotational guide member OGR2 comprising a plurality of friction pads 3PF2, which are arranged opposite the pads 3PF1. These pads 3PF2 bear flat against the lower ring B2, which thus forms a second complementary member DOC_2 cooperating with the second rotational guide member OGR2.

In this way, the first shaft A1 is guided in rotation simultaneously by the first guide members OGR1_1 and OGR1_2 and by the second guide member OGR2.

The presence of a third grooved bearing OGR1_3, provided behind the friction pads 3PF1 and 3PF2 and cooperating with the rib N of the ring unit K, will be noted.

As shown in FIG. 3, the rings B1 and B2 are made of an electrically conductive material, in this case aluminum. Similarly, the friction pads 3PF1 and 3PF2 are made of an electrically conductive material, in this case bronze.

Each ring B1 and B2 is thus connected to the battery SE of the drone D via electrical contact with the friction pads, 3PF1 and 3PF2. Each pad 3PF1 and 3PF2 is electrically connected to the battery SE by a cable, in particular soldered to the rod of this pad, this cable being routed, for example, through cavities in the chassis C and/or between two inner layers of this chassis C. Each ring B1 and B2 is electrically connected to the propulsion unit P, as will be described later on. The mechanical cooperation of the rings B1 and B2 with the friction pads 3PF1 and 3PF2 thus allows the electrical power generated by the battery SE to be transmitted to the propulsion unit P. One of the bands B1 can also act as a positive terminal or phase terminal, and the other band B2 can thus act as a negative terminal or neutral terminal, depending on whether the electrical power source SE delivers direct or alternating current.

As shown in FIG. 5 and FIG. 6B, the ring unit K of the first shaft A1 comprises two tabs L1 and L2 which are oriented radially toward the inside of the ring unit K, the tabs being diametrically opposed. Each tab L1 and L2 thus defines a recess that accommodates one of the ends EXT1 and EXT2 of the second shaft A2, such that this end is pivotably connected with respect to this recess. The tabs L1 and L2 thus define the second axis of rotation AX2. In the example described, each tab comprises an upper half-shell and a lower half-shell (these are visible in FIG. 6A), the half-shells together defining the cavity for accommodating one end of the shaft A2.

As shown in FIG. 6A, at the tab L1 and a first end EXT1 of the second shaft A2, the first shaft A1 supports a second drive system E2 capable of pivoting the second shaft A2 about the second axis of rotation AX2. The second drive system E2 comprises a transmission cylinder CT with a polygonal, in this case hexagonal, cross section, which is driven by a motor and is inserted into an opening OR provided in the first end EXT1 of the second shaft A2, the cross section of which is complementary to that of the transmission cylinder CT. It will be noted that this first end EXT1 thus forms a member for transmitting the rotation of the motor of the second drive system E2 to the second shaft A2.

As shown in FIG. 6A and FIG. 6B, the second shaft A2 comprises, at each of its ends EXT1 and EXT2, a first bearing PL1, in this case a sleeve bearing, into which this end is fixedly fitted. For each tab L1 and L2, the first shaft A2 comprises a second bearing PL2, also in the form of a sleeve bearing, which is freely arranged in the recess defined by this tab. The second bearing PL2 is arranged concentrically around the first bearing PL1, the inner surface of the second bearing PL2 and the outer surface of the first bearing PL1 being smooth and in direct contact with one another. The second bearing PL2 of the tab L1 thus forms a first rotational guide member DOGR_1 for the second shaft A2 and the first bearing PL1 of the end EXT1 thus forms a first complementary member OC1_2 which mechanically cooperates with the first member DOGR_1, while the second bearing PL2 of the tab L2 forms a second rotational guide member DOGR_2 for the second shaft A2 and the first bearing PL1 of the end EXT2 thus forms a second complementary member DOC_2 which mechanically cooperates with the second member DOGR_2.

Each first bearing PL1 and each second bearing PL2 is made of an electrically conductive material, in particular sintered bronze impregnated or coated with electrically conductive grease. For each end EXT1 and EXT2, one cable (not shown), electrically connected to the propulsion unit P, is soldered to the first bearing PL1, while another cable, electrically connected to the upper ring B1 or lower ring B2, is soldered to the second bearing PL2. The electrical power delivered by the battery SE can thus be transmitted to the propulsion unit P via the pads 3PF1 and 3PG2, the rings B1 and B2, the first bearings PL1 and the second bearings PL2.

Each second bearing PL2 comprises a peripheral stop BT2 formed on an edge of the second bearing PL2, and the recess in each tab L1 and L2 comprises a peripheral groove GP, visible in FIG. 6A and FIG. 6B, in which the peripheral stop BT2 of the second bearing PL2 is accommodated. The first bearing PL1 comprises a peripheral stop BT1 formed on an edge of the first bearing PL1, this stop BT2 being clamped between a wall of the second shaft A2 and an edge of the second bearing PL2.

The second shaft A2 comprises a central part PCE, visible in FIG. 5, which supports the propulsion unit (P) and two rods that extend, along the second axis of rotation A2, on either side from the central part PCE to form the ends EXT1 and EXT2.

Lastly, one rotary collector (not shown) is arranged in the common base and in the movable base connecting the fixed legs PPF to the movable legs PPM, while another rotary collector COL is arranged in the recess in the tab L2 of the first shaft A1 accommodating the second end EXT2 of the second shaft.

At least one cable (not shown) connects the central control unit UCC to this rotary collector through one of the fixed legs PPF, while another cable extends from this rotary collector to the other rotary collector COL through one of the movable legs PPM and inside the first shaft A1, for example inside a cavity in the ring unit K. Finally, a cable connects this rotary collector COL to the propulsion unit P through a cavity provided in the second shaft A2.

Figure 7:
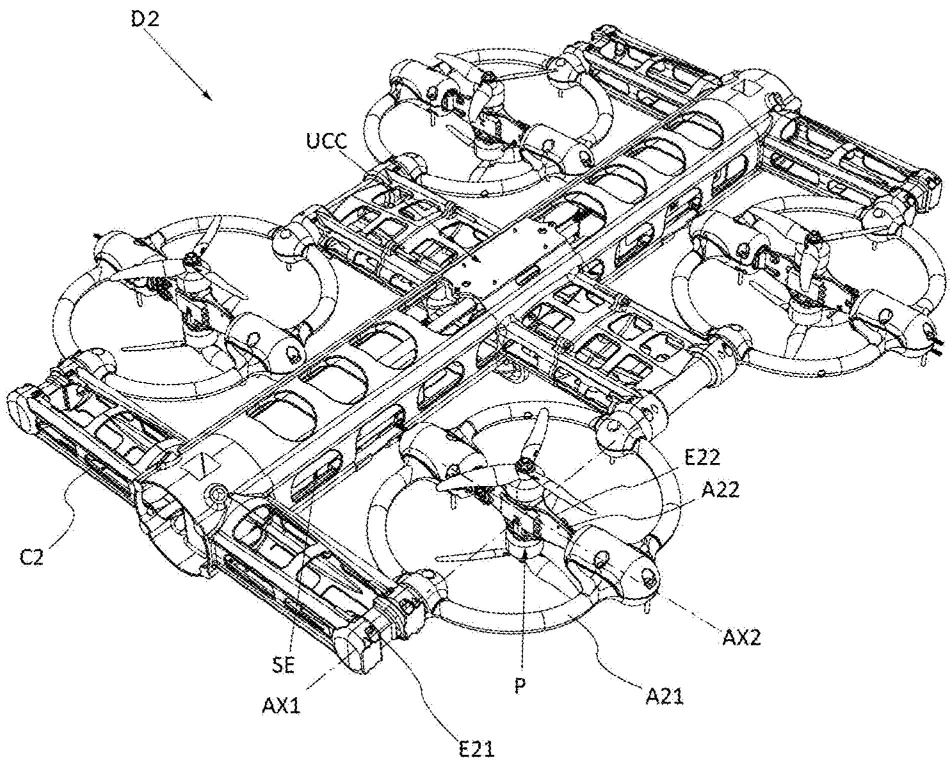
FIG. 7 schematically and partially shows a perspective view of an omnidirectional drone according to a second embodiment of the invention.

FIG. 7 shows an omnidirectional drone D2 according to a first embodiment of the invention.

The drone D2 comprises a chassis C2 on which four spaces are arranged, each space supporting a first shaft A21 that is rotatably mounted on the chassis C2 so as to rotate about a first axis of rotation AX1. Each first shaft A21 supports a second shaft A22 that is mounted so as to rotate about a second axis AX2, orthogonal to the first axis AX1, and on which a propeller P is mounted which comprises, in particular, a double contra-rotating propeller. The center of the chassis C2 supports a central control unit UCC which is able, in particular, to control the rotational speeds of the propulsion units P, and an electric battery SE which is arranged, in particular, to supply the propulsion system of the drone D2 with power. The drone D2 also comprises a first drive system E21 for rotating each first shaft A21 about the first axis AX1, and a second drive system E22 for rotating each second shaft A22 about the second axis AX2.

Figure 8:
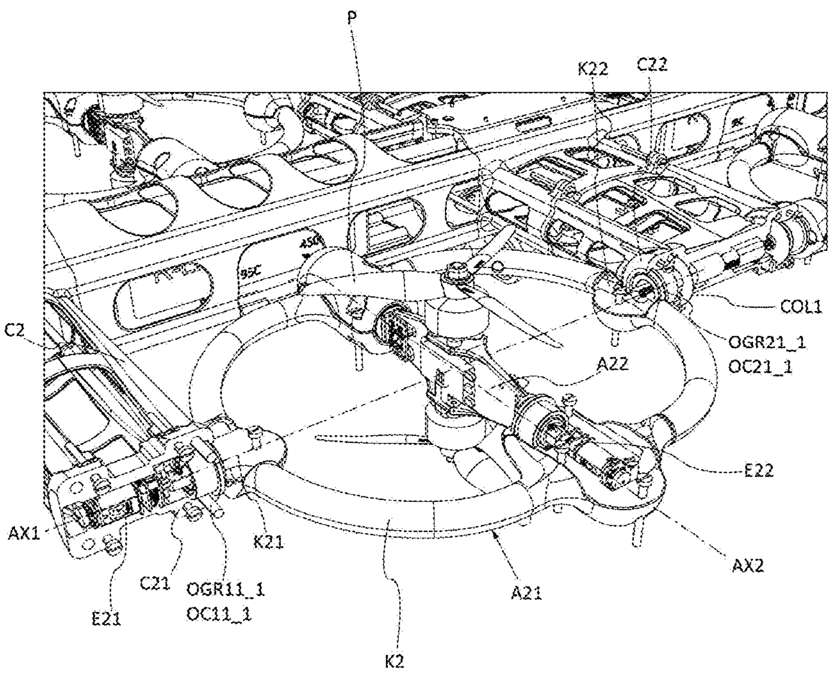
FIG. 8 schematically and partially shows a perspective view of a portion of the omnidirectional drone of FIG. 1.
Figure 9A:
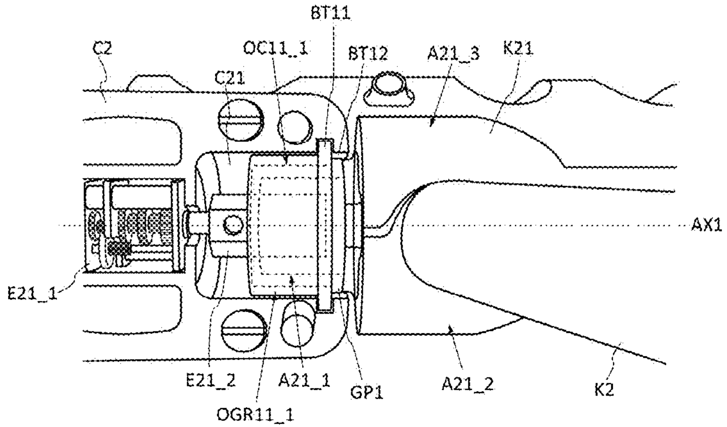
FIG. 9A schematically and partially shows a cross-sectional view of a connection between the chassis and a shaft of the omnidirectional drone of FIG. 7.
Figure 9B:
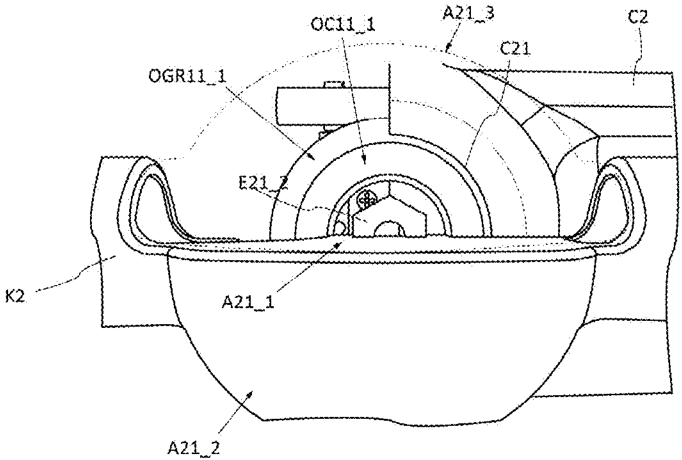
FIG. 9B schematically and partially shows a front view of the connection of FIG. 9A.

FIG. 8 shows a perspective view of a first shaft-second shaft-propeller assembly A21-A22-P of the omnidirectional drone of FIG. 7, FIG. 9A shows a cross-sectional view of a connection between the chassis C2 and the first shaft A22 of the assembly of FIG. 8, and FIG. 9B shows a front view of this connection. In the following, only one of these assemblies will be described, it being understood that the four assemblies shown in FIG. 7 are identical.

As shown in FIG. 8, the first shaft A21 comprises an oblong-shaped frame K2 comprising two diametrically opposed pivots K21 and K22, each pivotably mounted in a recess C21 and C22 in the chassis C2, said recesses facing one another. These recesses C21 and C22 thus define the first axis of rotation AX1.

As shown in FIG. 9A and FIG. 9B, the first drive E21 is accommodated in the chassis C2, in one of these recesses C21. The first drive device E21 comprises a motor E21_1 with a shaft that rotates about the first axis of rotation AX1, on which a transmission cylinder E21_2 is mounted. The transmission cylinder E21_2 has a hexagonal cross section and fits into an opening in a transmission member A21_1 of the first shaft A21, formed by two half-shells A21_2 and A21_3 (dashed line in FIG. 9B) which are provided on one end of the first shaft A21 and together form the pivot K21. The half-shell A21_2 is connected to the rest of the first shaft A21 and each half-shell comprises a groove, the grooves facing one another when the half-shells are joined together so as to form the opening in the transmission member A21_1 into which the transmission cylinder E21_2 is inserted.

As shown in FIG. 9A, a tapped hole is provided in the transmission cylinder E21_2 in order to accommodate a set screw for securing the transmission cylinder E21_2 to the rotary shaft of the motor E21_1 and thereby transmit rotation from the shaft of the motor E21_2 to the first shaft A21 via the transmission member A21_1.

It will be noted that part of the transmission member A21_1 extends into the recess C21.

The chassis C2 comprises a first guide member OGR11_1 for guiding the first shaft A21 in rotation about said first axis of rotation AX1, and the first shaft A21 comprises a first complementary member OC11_1 which is arranged to cooperate mechanically with the first guide member OGR11_1 so as to remove at least one degree of freedom from the first shaft A21.

In the example described, the first complementary member OC11_1 is a first bearing which is mounted on the portion of the transmission member A21_1 that extends into the recess C21, while the first rotational guide member OGR11_1 is a second bearing which is mounted concentrically around the first bearing OC11_1.

The first bearing OC11_1 is a sleeve bearing, the longitudinal axis of which is substantially identical to the first axis of rotation AX1, and is fixedly mounted on the transmission member A21_1 of the first shaft A21, which is fitted into this first bearing OC11_1. The second bearing OGR11_1 is a sleeve bearing, the longitudinal axis of which is substantially identical to the first axis of rotation AX1, and is mounted freely in the recess C21. The inner surface of the second bearing OGR11_1 and the outer surface of the first bearing OC11_1 are smooth and in direct contact with one another.

The second bearing OGR11_1 comprises a peripheral stop BT11 that extends around its entire periphery on one of its edges. The recess C21 comprises a peripheral groove GP1 in which the peripheral stop BT11 of the second bearing OGR11_1 is accommodated. The first bearing OC11_1 comprises a peripheral stop BT12 that extends around its entire periphery on one of its edges. The peripheral stop BT12 of the first bearing OC11_1 is clamped between the peripheral stop BT11 of the second bearing OGR11_1 and a rim of the transmission member A21_1 of the first shaft A21.

Each of the first and second bearings OC11_1 and OGR11_1 is made of an electrically conductive material, in this case bronze.

The second bearing OGR11_1 is electrically connected to the battery SE by a cable, in particular soldered to this bearing, this cable extending inside the structure of the chassis C2. The first bearing OC11_1 is electrically connected to the propulsion unit P, as will be described later on.

As shown in FIG. 8, it will be noted that the chassis comprises, in the recess C22, a second guide member OGR21_1 for guiding the first shaft A21 in rotation about said first axis of rotation AX1, which takes the form of a bearing identical to the second bearing OGR11_1, and that the first shaft A21 comprises, at the pivot K22, a second complementary member OC21_1, which takes the form of a bearing identical to the first bearing OC11_1, and which is arranged so as to cooperate mechanically with the second guide member OGR21_1. These bearings OGR21_1 and OC21_1 are also made of bronze, such that one of the pivots K21 and K22 can act as a positive terminal or phase terminal, and the other of the pivots K21 and K22 can act as a negative terminal or neutral terminal, depending on whether the electrical power source SE delivers direct or alternating current.

Lastly, it will be noted that the chassis C2 comprises a rotary collector COL1 in the recess C22 connected to at least one cable extending from the central control unit UCC and another cable connected to the propulsion unit P via the bearing OC21_1 and inside a duct provided in the first shaft A21.

The structure of the second shaft A22 and the structure of its connection to the first shaft A21 are substantially identical to those of the first embodiment, as described in FIG. 6A and FIG. 6B, and will therefore not be described again.

It will be noted that the invention has been described in the context of an omnidirectional aerial drone, but it can be extended to other types of drone, such as an underwater drone or AUV, or to other types of propelled vehicle, which might or might not be remotely controllable, such as a car, motorcycle, truck, bicycle, train, airplane, helicopter or ship.

The foregoing description clearly explains how the invention achieves its set objectives, namely incorporating a space-saving solution for transmitting the electrical power supplied by a power source mounted on the chassis to the propulsion unit of a propelled vehicle, in particular an omnidirectional drone, by proposing making use of the rotational guide members for the rotary shafts of this vehicle by giving them a second function of transmitting electrical power.

In any case, the invention is not limited to the embodiments specifically described in this document, and extends in particular to any equivalent means and to any technically operative combination of these means. In particular, it is possible to envisage other structural materials, in particular electrically conductive materials and magnetic guide elements, in particular electromagnets. Similarly, an arbitrary number of propulsion units can be rotatably mounted on the second shafts so as to modify the total thrust force of the drone and, consequently, the maximum speed attainable by this drone.

The invention claimed is:

1. A propelled vehicle comprising:

an electrical power source, a chassis supporting the electrical power source, a first shaft supporting a propulsion unit of said propelled vehicle, mounted so as to rotate on the chassis about a first axis of rotation, and a first drive device for rotating the first shaft about said first axis of rotation, wherein the chassis comprises a first guide member for guiding the first shaft in rotation about said first axis of rotation, and wherein the first shaft comprises a first complementary member arranged to mechanically cooperate with the first guide member so as to remove at least one degree of freedom from the first shaft other than the rotation of the first shaft about the first axis of rotation, wherein the first guide member and the first complementary member are electrically conductive and are electrically connected to one another, the first guide member being electrically connected to the electrical power source and the first complementary member being electrically connected to the propulsion unit.

2. The propelled vehicle as claimed in claim 1, wherein the first drive device comprises a motor provided with a rotary shaft that rotates about the first axis of rotation; wherein the first shaft comprises a transmission member that is mechanically connected to the rotary shaft of the motor so that rotation of the shaft of the motor is transmitted to the first shaft; wherein the first complementary member comprises a first bearing which is mounted on the transmission member and wherein the first guide member comprises a second bearing which is mounted concentrically around the first bearing.

3. The propelled vehicle as claimed in claim 2, wherein the first shaft comprises a frame comprising two diametrically-opposed pivots, each pivotably mounted in a recess in the chassis, said recesses facing one another, wherein the transmission member is arranged on one of the pivots so as to extend into one of said recesses, the rotary shaft of the motor extends into the recess, wherein the first bearing is arranged in the recess, the profile of the recess corresponding substantially to that of the second bearing.

4. The propelled vehicle as claimed in claim 1, wherein the first shaft comprises a ring unit that is rotationally symmetrical about the first axis of rotation, wherein the first complementary member comprises a band mounted on the ring unit and wherein the first guide member comprises a pad bearing flat against said band.

5. The propelled vehicle of claim 4, wherein the pad further comprises a rod and wherein the chassis (C) comprises a pressing module for pressing the pad onto said band, and wherein the pressing module comprises a guide part into which the rod of the pad fits.

6. The propelled vehicle as claimed in claim 1, wherein the propelled vehicle further comprises a second guide member for guiding the first shaft in rotation about said first axis of rotation, and wherein the first shaft comprises a second complementary member arranged to mechanically cooperate with the second guide member so as to remove at least one degree of freedom from the first shaft other than the rotation of the first shaft about the first axis of rotation, wherein the second guide member and the second complementary member are electrically conductive and are electrically to one another, the second guide member being electrically connected to the electrical power source and the second complementary member being electrically connected to the propulsion unit.

7. The propelled vehicle as claimed in claim 1, further comprising a central control unit for the propelled vehicle which is capable of exchanging data with the propulsion unit, a plurality of fixed legs which extend from the chassis to a base; a plurality of movable legs which extend from a movable base, which is mounted on the base so as to rotate about the first axis of rotation, to the first shaft, wherein a rotary collector is arranged in the base and in the movable base; wherein at least one cable extends from the central control unit to the rotary collector through one of the fixed legs; wherein another cable extends from the rotary collector to the propulsion unit through one of the movable legs.

8. The propelled vehicle as claimed in claim 1, wherein the propelled vehicle comprises:

a second shaft mounted on the first shaft so as to rotate about a second axis of rotation, the second shaft supporting said propulsion unit of said propelled vehicle;

a second drive device for rotating the second shaft about said second axis of rotation, wherein the first shaft comprises a first guide member for guiding the second shaft in rotation about said second axis of rotation; wherein the second shaft comprises a first complementary member arranged to mechanically cooperate with the first guide member of the first shaft so as to remove at least one degree of freedom from the second shaft other than the rotation of the second shaft about the second axis of rotation, wherein the first guide member of the first shaft and the first complementary member of the second shaft are electrically conductive and are electrically connected to one another, the first guide member of the first shaft being electrically connected to the first complementary member of the first shaft and the first complementary member of the second shaft being electrically connected to the propulsion unit.

9. The propelled vehicle as claimed in claim 8, wherein the second drive device comprises a motor provided with a rotary shaft that rotates about the second axis of rotation; wherein the second shaft comprises a transmission member that is mechanically connected to the rotary shaft of the motor so that rotation of the shaft of the motor is transmitted to the second shaft; wherein the first complementary member of the second shaft comprises a first bearing which is mounted on the transmission member of the second shaft and wherein the first guide member of the first shaft comprises a second bearing which is mounted concentrically around the first bearing.

10. The propelled vehicle as claimed in claim 9, wherein the propelled vehicle further comprises a central control unit for the propelled vehicle which is capable of exchanging data with the propulsion unit, wherein the second shaft comprises two diametrically opposed pivots, each pivotably mounted in a recess in the first shaft, said recesses facing one another, wherein the transmission member of the second shaft is arranged on one of the pivots of the second shaft to extend into one of said recesses and the rotary shaft of the motor extends into this recess, wherein a rotary collector is arranged in the other of the recesses in the first shaft, and wherein at least one cable extends from the central control unit to the rotary collector through the first shaft and wherein another cable extends from the rotary collector to the propulsion unit through the second shaft.

11. The propelled vehicle as claimed in claim 1, wherein the propelled vehicle is an omnidirectional aerial drone.

12. A propelled vehicle comprising:

an electrical power source, a chassis supporting the electrical power source, a first shaft supporting a propulsion unit of said propelled vehicle, mounted so as to rotate on the chassis about a first axis of rotation, and a first drive device for rotating the first shaft about said first axis of rotation, wherein the chassis comprises a first guide member for guiding the first shaft in rotation about said first axis of rotation, and wherein the first shaft comprises a first complementary member arranged to mechanically cooperate with the first guide member so as to remove at least one degree of freedom from the first shaft other than the rotation of the first shaft about the first axis of rotation, wherein the first guide member and the first complementary member are electrically conductive and are electrically connected to one another, the first guide member being electrically connected to the electrical power source and the first complementary member being electrically connected to the propulsion unit, wherein the first drive device comprises a motor provided with a rotary shaft that rotates about the first axis of rotation; wherein the first shaft comprises a transmission member that is mechanically connected to the rotary shaft of the motor so that rotation of the shaft of the motor is transmitted to the first shaft; wherein the first complementary member comprises a first bearing which is mounted on the transmission member and wherein the first guide member comprises a second bearing which is mounted concentrically around the first bearing.

13. The propelled vehicle as claimed in claim 12, wherein the first shaft comprises a frame comprising two diametrically opposed pivots, each pivotably mounted in a recess in the chassis, said recesses facing one another, wherein the transmission member is arranged on one of the pivots so as to extend into one of said recesses, the rotary shaft of the motor extends into the recess, wherein the first bearing is arranged in the recess, the profile of the recess corresponding substantially to that of the second bearing.

14. The propelled vehicle as claimed in claim 12, wherein the first shaft comprises a ring unit that is rotationally symmetrical about the first axis of rotation, wherein the first complementary member-comprises a band mounted on the ring unit and wherein the first guide member comprises a pad bearing flat against said band.

15. The propelled vehicle of claim 14, wherein the pad further comprises a rod and wherein the chassis comprises a pressing module for pressing the pad onto said band, and wherein the pressing module comprises a guide part into which the rod of the pad fits.

16. The propelled vehicle as claimed in claim 12, wherein the propelled vehicle comprises a second guide member for guiding the first shaft in rotation about said first axis of rotation, and wherein the first shaft comprises a second complementary member arranged to mechanically cooperate with the second guide member so as to remove at least one degree of freedom from the first shaft other than the rotation of the first shaft about the first axis of rotation, wherein the second guide member and the second complementary member are electrically conductive and are electrically to one another, the second guide member being electrically connected to the electrical power source (and the second complementary member being electrically connected to the propulsion unit.

17. The propelled vehicle as claimed in claim 12, further comprising a central control unit for the propelled vehicle which is capable of exchanging data with the propulsion unit, a plurality of fixed legs which extend from the chassis to a base; a plurality of movable legs which extend from a movable base, which is mounted on the base so as to rotate about the first axis of rotation, to the first shaft, wherein a rotary collector is arranged in the base and in the movable base; wherein at least one cable extends from the central control unit to the rotary collector through one of the fixed legs; wherein another cable extends from the rotary collector to the propulsion unit through one of the movable legs.

18. The propelled vehicle as claimed in claim 12, wherein the propelled vehicle comprises: a second shaft mounted on the first shaft so as to rotate about a second axis of rotation, the second shaft supporting said propulsion unit of said propelled vehicle;

a second drive device for rotating the second shaft about said second axis of rotation, wherein the first shaft comprises a first guide member for guiding the second shaft in rotation about said second axis of rotation; wherein the second shaft comprises a first complementary member arranged to mechanically cooperate with the first guide member of the first shaft so as to remove at least one degree of freedom from the second shaft other than the rotation of the second shaft about the second axis of rotation, wherein the first guide member of the first shaft and the first complementary member of the second shaft are electrically conductive and are electrically connected to one another, the first guide member of the first shaft being electrically connected to the first complementary member of the first shaft and the first complementary member of the second shaft being electrically connected to the propulsion unit, wherein the second drive device comprises a motor provided with a rotary shaft that rotates about the second axis of rotation; wherein the second shaft comprises a transmission member that is mechanically connected to the rotary shaft of the motor so that rotation of the shaft of the motor is transmitted to the second shaft; wherein the first complementary member of the second shaft comprises a first bearing which is mounted on the transmission member of the second shaft and wherein the first guide member of the first shaft comprises a second bearing which is mounted concentrically around the first bearing.

19. The propelled vehicle as claimed in claim 18, wherein the propelled vehicle further comprises a central control unit for the propelled vehicle which is capable of exchanging data with the propulsion unit, wherein the second shaft comprises two diametrically opposed pivots, each pivotably mounted in a recess in the first shaft, said recesses facing one another, wherein the transmission member of the second shaft is arranged on one of the pivots of the second shaft to extend into one of said recesses and the rotary shaft of the motor extends into this recess, wherein a rotary collector is arranged in the other of the recesses in the first shaft, and wherein at least one cable extends from the central control unit to the rotary collector through the first shaft and wherein another cable extends from the rotary collector to the propulsion unit through the second shaft.

20. The propelled vehicle as claimed in claim 12, wherein the propelled vehicle is an omnidirectional aerial drone.

* * * * *